Feb. 6, 1934.   P. D. FLEHR   1,945,523
ELECTRIC METER
Filed Aug. 26, 1932
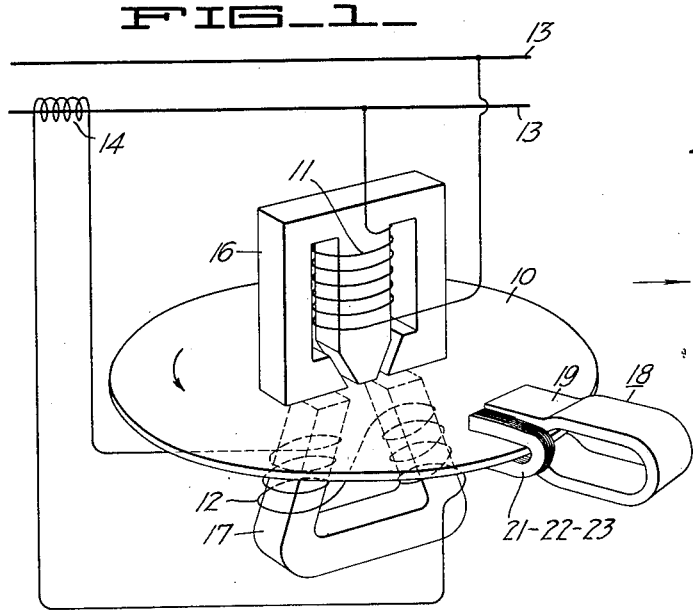
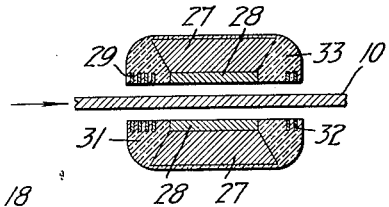
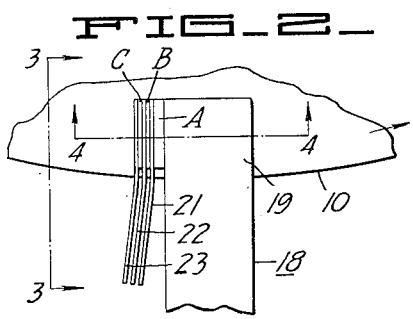
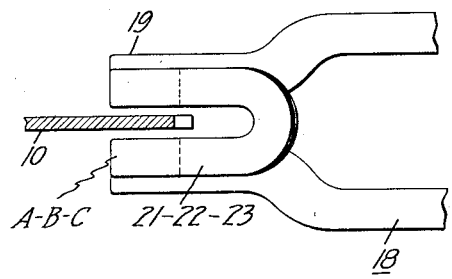
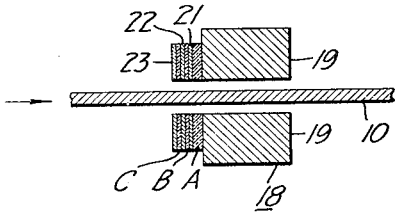
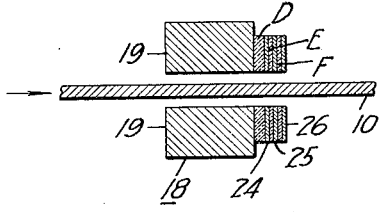
INVENTOR.

Patented Feb. 6, 1934

1,945,523

UNITED STATES PATENT OFFICE 1,945,523

ELECTRIC METER

Paul D. Flehr, San Mateo, Calif.

Application August 26, 1932. Serial No. 630,509

5 Claims. (Cl. 171—34)

This invention relates generally to electrical appliances, particularly those which utilize induction discs loaded magnetically, as for example alternating current watthour meters.

It is a primary object of the invention to make possible certain desired performance characteristics for apparatus of the above character. For example in an alternating current watthour meter, the invention makes possible the construction of a meter having greater accuracy.

Further objects of the invention will appear from the following description in which I have illustrated certain embodiments of my invention. It will be understood that the appended claims are to be accorded a range of equivalents consistent with the state of the prior art.

Referring to the drawing:

Fig. 1 is a diagrammatic perspective view, illustrating my invention incorporated in an alternating current watthour meter.

Fig. 2 is a detail, illustrating my magnetic means for applying a load to the induction disc of the meter.

Fig. 3 is a cross sectional detail, taken along the line 3—3 of Fig. 2.

Fig. 4 is a cross sectional detail taken along the line 4—4 of Fig. 2.

Fig. 5 is a detail similar to Fig. 4, but showing a modified form of my invention.

Fig. 6 is a detail similar to Fig. 4, but showing a further modified form of the invention.

It is well known that certain electrical meters, adapted for use in conjunction with alternating current systems, normally have characteristics which make for inaccuracy. For example in alternating current watthour meters employed in conjunction with domestic distribution lines, the accuracy curve of the meter frequently shows a drooping characteristic for relatively low loads, as for example in the neighborhood of 15%. It has previously been proposed to rectify this drooping low load characteristic, by forming certain of the cores of the meter, as for example the potential core, partly of some magnetic material having relatively high magnetization for low magnetizing currents, as for example a nickel iron alloy, and the remainder of the core from ordinary high silicon transformer iron. Such a meter is disclosed in British specification 309,956, of 1929. Expedients of this character operate upon the principle that they modify the driving torque upon the induction disc, produced by the joint action of the potential and current cores. I have found that, rather than to modify the driving torque upon the induction disc to modify the performance of the meter, it is possible to modify the load or damping torque upon the disc. The load or damping torque upon the induction disc is commonly produced magnetically, as for example by providing a permanent magnet arranged adjacent the induction disc, to induce eddy currents.

Referring to Fig. 1, the parts of the alternating current watthour meter illustrated therein consists of an induction disc 10, a potential coil 11, and a current coil 12. The potential coil 11 is shown connected across the alternating current supply lines 13, while the current coil 12 is shown connected to a current transformer 14. Potential coil 11 is likewise shown associated with a potential core 16, while the current coil 12 is associated with a current core 17. The current and potential cores cooperate with the induction disc 10, to produce a torque substantially proportional to the in phase components of the two fluxes. Likewise associated with the disc 10, there is a permanent magnet 18, the poles 19 of which are arranged upon opposite sides of the disc. The flux linkage between the poles 19 of the magnet 18, apply a load or damping torque to the disc, thus tending to make the disc speed proportional to the driving torque.

Magnet 18 imposes a load or damping torque upon disc 10, by virtue of eddy currents induced in the conductive material of disc 10. Obviously if the effective flux linkage traversing the induction disc is decreased for a given rate of rotation of the disc, the eddy currents will be less intense, likewise if the effective flux linkage traversing the induction disc is increased for a given speed of rotation, the eddy currents induced within the disc will be of greater intensity, and the damping torque or load upon the disc will be correspondingly increased.

In accordance with my invention, in order to automatically vary the effective flux linkage traversing the disc, for a given speed of rotation, I provide one or more additional magnetic elements 21, 22, and 23 associated with the poles 19 of the permanent magnet 18. As shown in Figs. 2, 3 and 4, magnetic elements 21 to 23 inclusive are positioned upon the sides of the poles 19, which face oppositely to the direction of rotation of the disc 10. Each of these magnetic elements can be U-shaped or in the shape of a horse-shoe, as shown in Fig. 3, and their pole pieces are retained in spaced relationship to each other, and with respect to the pole pieces 19, by suitable spacers A, B, and C of non-magnetic material.

For reasons which will be presently apparent,

I prefer to form elements 21, 22 and 23 of magnetic material having relatively high magnetization for small magnetizing currents, as for example an alloy of 78.5% nickel and 21.5% iron. Likewise these elements can either be single pieces of sheet metal, or each formed of a plurality of relatively thin sheet metal laminations in order to reduce losses, and in order to negative any tendency to retain magnetism.

The manner in which my invention operates can be made clearer by reference to Fig. 4. Assuming first that the disc 10 is stationary, flux linkage will traverse the disc 10 directly between the pole pieces 19, and a certain amount of flux linkage will bridge the nonmagnetic gaps A, B and C, to be largely bypassed or shunted by the magnetic elements 21, 22 and 23. Of the several magnetic elements 21, 22 and 23, it is obvious that a greater amount of flux will attempt to bypass thru element 21 rather than thru element 22, and correspondingly a lesser amount will tend to bypass thru element 23 than element 22. By making these elements of a nickel iron alloy, having relatively high magnetization for small magnetizing forces, and which will become saturated more readily than ordinary iron, elements 21 and 22 may be arranged to be saturated for a stationary position of disc 10, and element 23 magnetized below saturation.

Now assuming that a driving torque is placed upon the induction disc causing it to rotate in the direction indicated by the arrow in Fig. 4, eddy currents are induced in the disc by the flux linkage traversing the same, and which is not bypassed or shunted by the magnetic elements 21, 22 and 23. At the same time the flux linkage traversing the disc is distorted in the direction of rotation of the disc, thus tending to cause a lesser concentration of flux on the left hand side of the pole pieces 19, as viewed in Fig. 4. This in turn results in a lesser amount of flux linkage available for bypassing thru element 23, and correspondingly a greater amount of flux linkage is available for traversing the induction disc. As the speed of the disc is further increased the amount of flux linkage passing thru element 22 is likewise decreased to such a value as to reduce the magnetization of this element below saturation. A still further increase in speed can reduce the magnetization of element 21 below saturation, or so distort the field of the flux linkage, as to cause the amount of flux linkage shunted thru elements 21, 22 and 23 to be substantially negligible.

It is obvious that the mode of operation described above, makes it possible to so modify the load or damping torque produced by the magnet 18 upon the induction disc 10, as to compensate for any tendency of the meter to have a drooping characteristic for relatively low loads. In this connection it is to be noted that the degree of compensation, and likewise the extent of compensation with respect to the capacity of the meter, can be adjusted in various ways, as for example by varying the magnetic material of which the shunt magnetic elements are made, by varying the cross sectional area of these elements, by varying the number of these elements, or by varying the nature of the nonmagnetic gaps. In the event the compensation is required only for relatively low loads, the gap A between the pole pieces 19 and the first magnetic element 21, can be made relatively larger than the gaps between the remainder of the magnetic elements.

In Fig. 5 a number of shunting magnetic elements 24, 25 and 26, associated with spacers D, E, and F, are arranged alongside the edges of the pole pieces 19 which are faced in the direction of rotation of the induction disc. Such an arrangement tends to decrease the effective flux linkage passing thru the induction disc, as the speed of the disc increases. In other words as the flux linkage between the poles 19 is distorted, varying amounts of flux linkage are shunted by the elements 24, 25 and 26, depending upon the amount of distortion. In this case the magnetic elements 24, 25 and 26 can be likewise made of a nickel iron alloy having a permeability curve showing relatively high magnetization for small magnetizing forces, and having a sharply defined knee at the point where saturation commences. An arrangement of this character can be utilized to compensate for an otherwise drooping meter characteristic on relatively heavy or overloads.

An arrangement such as is illustrated in Fig. 6 can be employed to augment the compensation just described above, and to secure compensation for both low loads and overloads. In this case the poles 27 of the permanent magnet are provided with inner layers 28 of magnetic material which is maintained saturated. This arrangement tends to cause an increased amount of spraying of magnetic linkage, from the sides of the magnetic poles. Arranged upon that side of the poles 27 faced opposite to the direction of rotation, I have shown magnetic elements 29, which are spaced apart by non-magnetic gaps, and also spaced from the adjacent side plates of poles 27. Such spacing can be afforded by insulating material 31. Arranged adjacent the sides of the poles 27 faced in the same direction as the direction of rotation of the induction disc, are the additional magnetic elements 32, likewise spaced apart and from the poles 27, by insulating material 33. Elements 29 can be so constructed and arranged as to compensate for any tendency of the meter to have a low load drooping characteristic, and correspondingly the elements 32 can be so made and arranged to compensate for a tendency of the meter to have a drooping characteristic for certain degrees of overload. Obviously the overload compensation can only be carried to a certain practical degree, but will enable a certain amount of overload in the meter without causing serious error.

I claim:

1. In an electric meter, an induction disc, a magnet serving to apply a load torque to the disc by inducing eddy currents in the disc, and means for automatically varying the flux from said magnet which is effective to induce said eddy currents in accordance with the rate of movement of said disc.

2. In a meter, an induction disc, a permanent magnet serving to apply a load torque to the disc by inducing eddy currents in the disc, and an auxiliary magnetic bypass element associated with said permanent magnet, and operative to bypass an amount of flux linkage variable in accordance with the rate of movement of said disc.

3. In an electrical meter having an induction disc and magnetic means to apply a load torque to the disc, characterized in this, that the magnetic means supplies an amount of flux linkage to induce eddy currents in the disc which varies as the speed of the disc varies, for a given temperature of operation.

4. In an electric meter, a rotatable induction disc, a permanent magnet serving to apply a load torque to the disc by inducing eddy currents in the disc, and magnetic means associated with the pole pieces of said magnet serving to modify the characteristic load accuracy curve for the meter for a given temperature of operation.

5. In an electric meter, a rotatable induction disc, a permanent magnet serving to apply a load torque to the disc by inducing eddy currents in the disc, and magnetic means associated with the pole pieces of said magnet serving to modify the characteristic load accuracy curve for the meter for a given temperature of operation, said means being arranged to shunt varying amounts of flux between the pole pieces of said magnet in accordance with the speed of rotation of the disc.

PAUL D. FLEHR.